United States Patent [19]

Buter

[11] Patent Number: 4,857,574

[45] Date of Patent: Aug. 15, 1989

[54] DISPERSION OF ADDITION (CO)POLYMERS IN AN ORGANIC LIQUID

[75] Inventor: Roelof Buter, Dieren, Netherlands

[73] Assignee: Akzo nv, Arnhem, Netherlands

[21] Appl. No.: 155,099

[22] Filed: Feb. 11, 1988

Related U.S. Application Data

[60] Division of Ser. No. 933,334, Nov. 20, 1986, which is a continuation of Ser. No. 756,258, Jul. 8, 1985, abandoned.

[30] Foreign Application Priority Data

Jul. 20, 1984 [NL] Netherlands ................ 8402305

[51] Int. Cl.$^4$ .............. C08F 279/06; C08F 2/14; C08K 5/01; C08K 5/56
[52] U.S. Cl. ................ 524/396; 524/398; 524/399; 524/400; 524/431; 524/441; 524/474; 524/779; 524/780; 524/781; 524/783; 524/785; 524/786; 524/856; 525/123; 525/131; 525/286; 525/301; 525/302; 525/303; 525/310; 525/316; 525/340
[58] Field of Search .......... 524/396, 398, 399, 400, 524/431, 441, 474, 779–808, 856; 525/125, 131, 286, 301–303, 310, 316, 340

[56] References Cited

U.S. PATENT DOCUMENTS

| | | | |
|---|---|---|---|
| 3,185,659 | 5/1965 | Adams et al. | 524/856 |
| 3,299,179 | 1/1967 | Rippel | 524/856 |
| 3,449,471 | 6/1969 | Weitzel et al. | 525/266 |
| 3,779,977 | 12/1973 | Hicks | 524/474 |
| 3,897,260 | 7/1975 | Yaginuma et al. | 524/856 |
| 4,743,643 | 5/1988 | Buter | 524/396 |

FOREIGN PATENT DOCUMENTS

| | | |
|---|---|---|
| 2157886 | 6/1971 | Fed. Rep. of Germany . |
| 2259838 | 8/1975 | France . |
| 0030894 | 3/1976 | Japan ................ 524/856 |
| 893429 | 4/1962 | United Kingdom . |
| 990154 | 4/1965 | United Kingdom . |

*Primary Examiner*—Herbert J. Lilling
*Attorney, Agent, or Firm*—Stevens, Davis, Miller & Mosher

[57] ABSTRACT

Stable dispersion of addition (co)polymers in an inert relatively non-polar organic hydrocarbon liquid, the dispersed particles embracing both a (co)polymer and a polymer containing an ethylenically unsaturated monomer. The (co)polymers are substantially composed of:

(a) 5 to 100 mole % of styrene and/or methyl styrene;
(b) 0 to 95 mole % of alkyl methacrylate having 1 or 2 carbon atoms in the alkyl group and/or alkoxyalkylene methacrylate having 1 or 2 carbon atoms in the alkoxy group and the alkylene group;
(c) 0 to 40 mole % of alkyl methacrylate having 3 to 12 carbon atoms in the alkyl group;
(d) 0 to 40 mole % of hydroxyalkyl methacrylate having 2 to 12 carbon atoms in the alkyl group and/or glycidyl methacrylate; and
(e) 0 to 20 mole % of m methacrylic acid.

The (co)polymers are grafted to a polymer of a number average molecular weight of 2000 to 10.000, at least 60% by weight of which consists of butadiene, the weight percentage of the butadiene-containing polymer being 20 to 200% of that of the (co)polymer and the sum of this percentage and the percentage of styrene and/or methyl styrene in the copolymer being higher than or equal to 50.

At room temperature the dispersions dry to form a smooth and very glossy film.

21 Claims, No Drawings

DISPERSION OF ADDITION (CO)POLYMERS IN AN ORGANIC LIQUID

This is a division of application Ser. No. 933,334 filed Nov. 20, 1986 which in turn is a continuation of Ser. No. 756,258, filed July 18, 1985 and abandoned.

The invention relates to a stable dispersion of addition (co)polymers in an inert relatively non-polar organic hydrocarbon liquid, the dispersed particles embracing both a (co)polymer and a polymer containing an ethylenically unsaturated monomer, and to a process for the preparation of such a dispersion and to the use of these dispersions in coating compositions.

A process of the type indicated above is disclosed in British Patent Specification No. 990 154.

The dispersions of the addition (co)polymers in an organic liquid are stabilized by a graft polymer formed in situ. For the preparation of the addition (co)polymers use is generally made of methyl methacrylate, β-ethoxyethyl methacrylate, ethyl acrylate, acrylonitrile, methacrylic acid, acrylic acid or the amides of these acids. The polymer containing an ethylenically unsaturated monomer generally consists of an unsaturated polymer such as degraded natural rubber or a copolymer of vinyl toluene and butadiene. Commonly used organic solvents are turpentine, hydrocarbon fractions from paraffin oil and benzene. In order to prevent the molecular weight of the addition (co)polymers from becoming so high that no longer any stable dispersion can be obtained, a chain transfer agent is added.

The resulting dispersions are white to whitish yellow and dry at room temperature to form a white powder. Therefore, about 10% weight of plasticizer is added, so that after heating to above 100° C. a glossy film is produced. There was therefore need for dispersions which cure at a lower temperature to form a glossy film without there being any need to add a plasticizer.

The present invention provides a dispersion which meets said need. The invention consists in that with a dispersion of the well-known type mentioned in the opening paragraph the (co)polymers are substantially composed of:
  a. 5 to 100 mole % of styrene and/or methyl styrene;
  b. 0 to 95 mole % of alkyl methacrylate having 1 or 2 carbon atoms in the alkyl group and/or alkoxyalkylene methacrylate having 1 or 2 carbon atoms in the alkoxy group and the alkylene group;
  c. 0 to 40 mole % of alkyl methacrylate having 3 to 12 carbon atoms in the alkyl group;
  d. 0 to 40 mole % of hydroxyalkyl methacrylate having 2 to 12 carbon atoms in the alkyl group and/or glycidyl methacrylate; and
  e. 0 to 20 mole % of methacrylic acid, and that they are grafted to a functionalized or non-functionalized polymer of a number of average molecular weight of 2 000 to 10 000 at least 60% by weight of which consists of butadiene, the weight percentage polymer of the butadiene-containing being 20 to 200% of that of the (co)polymer and the sum of this percentage and the percentage styrene and/or methyl styrene in the copolymer being higher than or equal to 50.

Surprisingly, it has been found that even at room temperature the dispersions according to the invention dry to form a smooth and very glossy film. Moreover, most dispersions according to the invention also result in a wholly transparent film.

It should be added that it was known from British Patent Specification No. 893 429 that use might be made of styrene or vinyl toluene as suitable monomers for the preparation of a stable dispersion of the type mentioned in the opening paragraph.

However, as for the polymer containing an ethylenically unsaturated monomer use is made of a high molecular weight rubber in an amount lower than 20% by weight, based on the amount of the (co)polymer, the dispersions disclosed in it are not film forming at room temperature.

U.S. Patent Specification No. 3 779 977 discloses non-aqueous dispersions comprising a stable dispersion of a 30-60 weight percent acrylonitrile-containing copolymer grafted onto a diene homopolymer or copolymer having a molecular weight of 1000 to 10.000. These dispersions do not form a film at room temperature due to the polar character of the acrylonitrile. Therefore the coatings have to be cured by heating at temperatures of 150° C. to about 300° C. for a time sufficient to cross-link the film.

Dutch Patent Specification No. 272 263 discloses a process for preparing non-aqueous dispersions of the type mentioned in the opening paragraph. Though the optional use of styrene in the (co)polymer and of a low molecular weight diene homo- or copolymer are disclosed in it, and the slightest allusion is made to the specific compositions according to the present invention. In order to prevent excessive thickening or gelation it even recommends preparing the dispersions via a two-step process.

U.S. Patent Specification No. 3 449 471 discloses a process for producing thermoplastic molding compositions by grafting a (co)polymer onto a diene (co)polymer. In order to prevent the granules from sticking together use is made of a high molecular weight polybutadiene obtained by emulsion polymerisation.

French Patent Specification No. 2 259 838 discloses a process for producing an acrylonitrile-butadiene-styrene (ABS) elastomer by grafting a (co)polymer onto a diene (co)polymer. There is no question of the formation of a dispersion and for the preparation use is made of a polybutadiene having a molecular weight of 270.000.

German Patent Specification No. 2 157 886 discloses a process for producing a 1,2-polybutadiene and styrene containing-block (co)polymer by polymerisation in solution.

Chemical Abstracts Vol. 91 (1979), No. 22, 176794e discloses a coating composition comprising a graft copolymer derived from cis-1,4-polybutadiene, hydroxyalkyl acrylate or hydroxyalkyl methacrylate and other comonomers such as styrene. The graft copolymer is prepared by polymerisation in solution.

For the organic liquid in the dispersions according to the invention use is made of a non-solvent for the (co)polymer and a solvent for the butadiene-containing polymer. It is therefore preferred that the organic liquid should contain at least 50% by weight of aliphatic hydrocarbons.

Examples of suitable organic liquids include turpentine, white spirit, petroleum ether and iso-octane.

When the (co)polymers contain less than 5 mole % of styrene and/or methyl styrene, the resulting dispersions are no longer film forming at room temperature.

Examples of suitable methacrylate monomers according to the present invention may include: methyl methacrylate, ethyl methacrylate, ethoxyethyl methacrylate, ethoxymethyl methacrylate and methoxyethyl methacrylate.

When use is made of more than 40 mole % of alkyl methacrylate monomers with 3 to 12 carbon atoms in the alkyl group, the copolymer tends to dissolve in the organic liquid. Also the use of more than 40 mole % of hydroxyalkyl methacrylate with 2 to 12 carbon atoms in the alkyl group and/or glycidyl methacrylate does not give very favorable results as a result of a coarsening of the dispersion. For, in that case no transparent films are formed any more at room temperature. Use of more than 20 mole % of methacrylic acid may give rise to similar problems.

As examples of other monomers that may be used in small amounts in the (co)polymer may be mentioned acrylic acid and the esters thereof. The use in relatively large amounts must be disadvised in that it may give rise to problems due to reduced polymerization speed and incomplete conversion. Examples of suitable monomers, in addition to acrylic acid and the esters derived therefrom, also include various amino methacrylates, such as N,N'-dimethyl aminoethyl methacrylate, acrylonitrile, methacrylonitrile, maleic anhydride, N-methylol acrylamide, N-methylol methacrylamide, dimethyl maleate, diethyl maleate, dimethyl itaconate, diethyl itaconate and N-vinyl pyrrolidone.

The polymers containing an ethylenically unsaturated monomer that may be used according to the invention contain at least 60% by weight of butadiene and have a number average molecular weight of 2000 to 10000. Whereas the use of polymers of a lower molecular weight generally leads to instable dispersions, the use of polymers of a molecular weight higher than 10000 leads to dispersions which are not film forming at room temperature. Also the use of a butadiene-containing polymer in an amount lower than 20% by weight, based on the amount of the (co)polymer, leads to dispersions that are not film forming at room temperature.

It has been found that the most favorable results are obtained when the weight ratio between the (co)polymers and the butadiene-containing polymer is in the range of 4:1 to 1:2.

The polymer which contains at least 60% by weight of butadiene may optionally be functionalized with —OH and/or —COOH groups. Attractive coating compositions may be obtained when the polymer functionalized with —OH and/or —COOH groups are reacted with diisocyanate to form a polyurethane or polyamide.

Of the polymers suitable for use in the dispersions according to the invention at least 60% by weight is constituted by butadiene and the remainder by styrene and/or acrylonitrile.

After evaporation of the solvent of the dispersion a film forming coating is obtained which can be cured to the air with so-called driers. They are metal salts that are also used in curing well-known alkyl resins based on unsaturated oils and/or unsaturated fatty acids. Examples of suitable driers are the octoates and/or naphthenates of cobalt, iron, copper, manganese, zirconium, cerium, calcium, barium and lead. To promote the pot stability an anti-skinning agent may still be introduced into the dispersions according to the invention. Suitable anti-skinning agents are oximes such as butyraldehyde oxime and ethylmethyl ketoxime.

Generally, favorable results are obtained when the driers and the anti-skinning agents are incorporated in an amount of 0,01 to 1% by weight, calculated on the weight of the film forming constituents.

Curing the films obtained from the dispersions of the present invention also may be effected in a completely different way without using a drier. This is the case when the dispersed particles contain a great many hydroxyl groups. For curing use should be made then of a compound reacting with hydroxyl groups.

The hydroxyl groups in the dispersed particles may originate from the butadiene-containing polymer or the copolymer, in which latter case the copolymer is prepared using hydroxy alkyl methacrylate.

The compounds reacting with hydroxyl groups are generally N-methylol and/or N-methylol ether groups-containing aminoplasts obtained by reacting an aldehyde, such as formaldehyde, with an amino groups—or amido groups-containing compound such as melamine, urea, N,N'-ethylene urea, dicyanodiamide and benzoguanamine. It is preferred that the resulting compounds should entirely or partly be etherified with alcohols containing 1 to 6 carbon atoms, such as methanol, ethanol, n-propanol, isopropanol, n-butanol, isobutanol, amyl alcohol, hexanol or mixtures thereof. Particularly favourable results may be obtained using a methylol melamine with 4 to 6 methylol groups per molecule of melamine, at least 3 methylol groups being etherified with butanol or a butanol etherified condensation product of formaldehyde and N,N'-ethylene diurea.

Other suitable compounds reacting with hydroxyl groups that may be used accordingly to the invention are, for instance, capped or non-capped polyisocyanates.

The curing agents reacting with hydroxyl groups are generally employed in an mount such that the molar ratio of the hydroxyl groups of the dispersion to the reactive groups of the curing agent is in the range of 0,7 to 1,5.

When use is made of a dispersion in which both methacrylic acid and glycidyl methacrylate are incorporated in the copolymer, there is no need to use a curing agent. It is only necessary then to heat the composition to a temperature in the range of 100° to 160° C.

The invention also relates to a process for the preparation of a stable dispersion of the known type indicated in the opening paragraph, in which process a composition substantially consisting of:

(a) 5 to 100 mole % of styrene and/or methyl styrene;
(b) 0 to 95 mole % of alkyl methacrylate with 1 or 2 carbon atoms in the alkyl group and/or alkoxy alkylene methacrylate with 1 or 2 carbon atoms in the alkoxy group and the alkylene group;
(c) 0 to 40 mole % of alkyl methacrylate with 3 to 12 carbon atoms in the alkyl group;
(d) 0 to 40 mole % of hydroxyalkyl methacrylate with 2 to 12 carbon atoms in the alkyl group and/or glycidyl methacrylate; and
(e) 0 to 20 mole % of methacrylic acid, together with an active amount of a peroxide as initiator is polymerized in an inert relatively non-polar organic hydrocarbon liquid at a temperature of 60° to 120° C. in the presence of a functionalized or non-functionalized polymer containing at least 60% by weight of butadiene and having a number average molecular weight in the range of 2000 to 10000, the weight percentage butadiene-containing polymer being 20 to 200% of that of the (co)polymer and the sum of this percentage and the percentage styrene and/or methyl styrene in the copolymer being higher than or equal to 50.

The most favorable results are obtained when the weight ratio between the (co)polymers and the butadiene-containing polymer is in the range of 4:1 to 1:2.

Satisfactory results are obtained when the polymerization is carried out in an inert relatively non-polar organic hydrocarbon liquid which is a non-solvent for polystyrene and/or polymethyl styrene and/or styrene-methacrylate copolymers and/or methyl styrene-methacrylate copolymers and/or methyl styrene-methacrylate-methacrylic acid copolymers and a solvent for the butadiene-containing polymer.

This condition is generally fulfilled when the inert relatively non-polar organic hydrocarbon liquid contains at least 50% by weight of aliphatic hydrocarbons.

Examples of suitable diluents include turpentine, white spirit, petroleum ether or iso-octane.

The process according to the invention is carried out using as initiator 0,1 to 10% by weight of a substituted or unsubstituted dibenzoyl peroxide, calculated on the butadiene-containing polymer.

Examples of suitable substituted dibenzoyl peroxides include di(orthomethylbenzoyl) peroxide and/or di(2,4-dichlorobenzoyl) peroxide. The polymerization reaction may be carried out within a wide temperature range of from 60° to 120° C.

In actual practice the polymerization is preferably carried out at a temperature in the range of from 80° to 100° C.

The invention also relates to the use of the above-described dispersions in applying a coating composition to wood, plastics materials and metal. These dispersions may contain the usual adjuvants and additives such as pigments, dispersing agents, colorants, solvents and accelerators for the curing reaction. Preferably, the pigment concentration amounts to at least 5% by weight, based on the addition (co)polymers.

The pigments suitable for use in the dispersions according to the invention may be of an acid, neutral or basic nature; they may be organic or inorganic. Optionally, the pigments may have been pre-treated to modify the properties. Examples of suitable pigments include: titanium dioxide, iron oxide, carbon black and phthalocyanine pigments. Also use may be made of metal pigments based on, say, aluminium and stainless steel. Particularly favorable results are obtained using a dispersion according to the invention containing a non-leafing aluminum. The resulting aluminium fixation was very satisfactory, which manifested itself in a coating having a very good metallic appearance.

The dispersions according to the invention may be applied to a substrate in any convenient manner. They may be applied by roller coating, spraying, brushing, sprinkling, flow coating, dipping or electrostatic spraying. The coating applied may be cured at ambient temperature after evaporation of the solvent or for 10 to 60 minutes at higher temperatures between, say, 60° and 160° C. in a drying oven.

The following examples are intended to illustrate the invention but are not to be construed as limiting in any manner the scope thereof.

The test methods mentioned in the following examples were all carried out in comformity with the given ASTM and DIN standard methods. The Persoz hardness was determined in accordance with the French industrial standard method NF T 30-016 and expressed in seconds. An acceptable minimum hardness value for automobile paint is about 200 seconds. An acceptable minimum value for wood paint is about 30 seconds and for parquet about 80 seconds.

The gloss was determined in accordance with the American standard method ASTM-D 523 at 60° and 20°.

A gloss value of more than 90 at 60° on a steel substrate is high; the same applies to a gloss value of over 80 at 20°.

On a wooden substrate a gloss value of 20 at 60° and of 5 at 20° are considered high values.

EXAMPLE I (comparative example)

In a 500 ml—three necked flask fitted with a stirrer, a reflux condenser and a thermometer the following ingredients were homogeneously mixed in accordance with Example 1$^c$ of British Patent Specification No. 990 154:

200 g methyl methacrylate
5 g polyisoprene (degraded rubber of a molecular weight of about 30000)
180 g turpentine (a diluent mainly consisting of aliphatic hydrocarbons and containing 17% by volume of aromatic constituents; boiling range 167°–180° C.)
0,2 g dibenzoyl peroxide (80%) and
0,05 g dodecyl mercaptane and stirred for 5 hours at a temperature of 85° C. If necessary, the mixture was cooled in order to keep the reaction temperature at 85° C. Upon completion of the reaction and cooling to room temperature a stable, milky white dispersions was obtained having a solids content of about 53% by weight and a viscosity of 0,15 Pa.s (determined with a Brookfield viscometer). At room temperature the dispersion dried to form a white powder.

EXAMPLE II

In a 500 ml—three necked flask fitted with a stirrer, a reflux condenser and a thermometer the following ingredients were homogeneously mixed as indicated in Example I:

100 g methyl methacrylate
100 g styrene
100 g polybutadiene (Lithene ®N, number average molecular weight 5000, and composed of 45% of vinyl-1,2- and 55% of trans- and cis-1,4 butadiene)
4 g dibenzoyl peroxide (80%) and
303 g turpentine and after deaeration nitrogen was passed through.

The mixture was subsequently heated to 90° C., at which temperature it was kept for 6 hours.

Upon completion of the reaction a dispersion with a bluish appearance was found to be obtained. The solids content was about 50% by weight, the viscosity (determined with a Brookfield viscometer) was 1,77 Pa.s and the average particle size 113 nm (determined by dynamic light diffusion). After drying of the resulting dispersion on various substrates (for instance: glass, wood, metal) a fully transparent coating displaying a high gloss was found to be obtained. When cobalt octoate (0,5 g of a 1% by weight of cobalt-containing solution per 100 g dispersion) and 0,2% by weight (calculated on the dispersion) of methylethyl ketoxime were added to the dispersion, the resulting coating applied to steel (Bonder 132) was found to have a Persoz hardness of 263 seconds at a thickness of 40 after 1 week's curing at room temperature. Also the gloss was found to amply satisfy the demands to be made on such a coating. On steel a value of over 100 was measured at 60°, and of 89 at 20°. On wood (oak) values of 48 and 18 were measured at 60° and 20°, respectively.

When in the preparation of the above-mentioned dispersion instead of 4 g of dibenzoyl peroxide as radical initiator 3 g of azobis-isobutyronitrile or 4 g of dilauroyl peroxide were used, it was found that in either case a white precipitate formed during the polymerization reaction.

EXAMPLE III

The procedure in this example was identical with that in Example II, except that use was made of the following amounts:
75 g methyl methacrylate
75 g styrene
150 g polybutadiene
4,5 g dibenzoyl peroxide (80%)
303 g turpentine Upon completion of the reaction a stable dispersion with a bluish appearance was obtained. The solids content was about 50% by weight, the viscosity 1,25 Pa.s and the average particle size 99 nm. After drying at room temperature a wholly transparent coating having a high gloss was obtained.

EXAMPLE IV

A dispersion was prepared in the same way as indicated in Example III, except that use was made of a polybutadiene having a number average molecular weight of 3500. The polybutadiene was composed of 20–25% of vinyl-1,2-butadiene, 40–45% of trans-1,4-butadiene and 30–40% of cis 1,4-butadiene.

The initiator used was 3,6-dibenzoyl peroxide (80%). The resulting dispersion was stable, had a bluish appearance and a solids content of 50% by weight. The viscosity was 2,27 Pa.s and the average particle size 125 nm. After drying at room temperature a wholly transparent coating displaying a high gloss was obtained.

EXAMPLE V

A dispersion was prepared in the same way as indicated in Example IV, except that use was made of as little as 3,0 g of dibenzoyl peroxide (80%). The resulting dispersion was stable and had a solids content of about 50% by weight, a viscosity of 0,85 Pa.s and an average particle size of 120 nm.

After cobalt naphthenate had been added (in an amount of 0,01% by weight, calculated on the solids content), the dispersion was applied to steel and wood in a coating thickness of 40 μm. After 1 week's curing at room temperature a Persoz hardness of 120 seconds was measured on steel (Bonder 132). The measured gloss had a value of over 100 at 60°, whereas a value of 94 was found at 20°. On wood (meranti) values of 59 and 38 were measured at 60° and 20°, respectively.

EXAMPLE VI

In the same way as indicated in Example IV a dispersion was prepared from the following ingredients:
90 g methyl methacrylate
90 g styrene
120 g polybutadiene
3,6 g dibenzoyl peroxide (80%)
303 g turpentine The resulting dispersion had a bluish appearance and was very stable. The solids content was about 50% by weight. After dilution with turpentine to a solids content of about 40% by weight a viscosity of 0,44 Pa.s was measured. The average particle size was 145 nm. After drying at room temperature a wholly transparent coating displaying a high gloss was obtained.

EXAMPLE VII

In the same way as indicated in Example II a dispersion was prepared consisting of

| | |
|---|---|
| methyl methacrylate | 90 g |
| styrene | 45 g |
| butyl methacrylate | 65 g |
| polybutadiene | 100 g |
| dibenzoyl peroxide (80%) | 3 g |
| turpentine | 455 g |

The resulting dispersion had a pale blue appearance. The solids content was about 40% by weight, the viscosity 0,67 Pa.s and the average particle size was 128 nm. After addition of cobalt naphthenate (0,01% by weight Co, calculated on the solids content) the dispersion was applied to wood (oak) to a layer thickness of 40 μm. The measured gloss values were 47 and 13 at 60° and 20°, respectively.

EXAMPLE VIII

A dispersion was prepared in the same way as indicated in Example VII, with the exception that as diluent there was used 370 g of Shellsol TD ®, a non-aromatic aliphatic hydrocarbon having a boiling range of 175° to 195° C.

The resulting bluish dispersion was stable and had a solids content of about 45% by weight. After evaporation to a solids content of about 50% by weight the viscosity was 0,65 Pa.s and the average particle size 180 nm. The chromatogram of the molecular weight distribution of the dispersed copolymer shows a peak at a number average molecular weight in the range 60000 to 1000000.

After adding 0,01% by weight of cobalt naphthenate (calculated on the solids content) and a curing time of one week at room temperature the properties of a 40 μm thick coating on steel and wood were measured. For the Persoz hardness on steel a value of 205 seconds was measured. The measured gloss values on oak were 60 and 18 at 60° and 20°, respectively.

EXAMPLE IX

A dispersion was prepared in the same way as indicated in Example IV, use being made of the following components:

| | |
|---|---|
| methyl methacrylate | 75 g |
| styrene | 75 g |
| OH-functionalized polybutadiene (number average molecular weight 5000 and composed of 87% of vinyl-1,2-butadiene and 13% of cis- and trans-1,4-butadiene) | 150 g |
| dibenzoyl peroxide (80%) | 3,75 g |
| turpentine | 454 g |

After the reaction mixture had been kept at 90° C. for 7 hours, it was cooled and a stable bluish white dispersion was obtained having a solids content of 40% by weight and a viscosity of 2,4 Pa.s. After drying at room temperature on different substrates the resulting coating invariably displayed a high gloss.

EXAMPLE X

In a three-necked 1-l flask fitted with a stirrer, a reflux condenser and a thermometer there were homogeneously mixed: 200 g of OH-functionalized butadiene-styrene-copolymer compound of 75% by weight of butadiene and 25% by weight of styrene (of a number average molecular weight of 3000, microstructure polybutadiene, 20% of vinyl-1,2-butadiene, 20% of cis-1,4-butadiene and 60% of trans-1,4-butadiene).

4 g of isophoron diisocyanate,
306 g of turpentine, and
2 drops of dibutyltin diacetate.

After heating the mixture under a nitrogen atmosphere for 2 hours at 120° C. the resulting polyurethane of a number average molecular weight of 9000 was dissolved in turpentine. The solids content of this solution was about 40% by weight. To 510 g of this solution the following components were added:

| | |
|---|---|
| methyl methacrylate | 75 g |
| styrene | 25 g |
| dibenzoyl peroxide (80%) | 1 g |
| turpentine | 152 g |

The resulting reaction mixture was kept under nitrogen for 8 hours at a temperature of 90° C.

After cooling the mixture a bluish-grey dispersion was obtained having a solids content of 40% by weight. After dilution to a solids content of 35% by weight the viscosity was 1,66 Pa.s. After drying at room temperature on different substrates the resulting coating invariably displayed a high gloss.

EXAMPLE XI

A dispersion was prepared in the same way as indicated in Example II, use being made of the following components:

| | |
|---|---|
| styrene | 75 g |
| methyl methacrylate | 67,5 g |
| methacrylic acid | 3 g |
| glycidyl methacrylate | 5,25 g |
| polybutadiene (Lithene ® N) | 150,75 g |
| dibenzoyl peroxide | 3,75 g |
| turpentine | 305 g |

The reaction mixture was subsequently kept under nitrogen for 6 hours at 90° C., followed by heating for 1 hour at 150° C.

After the reaction mixture had been cooled, a stable dispersion was found to be obtained displaying a bluish grey appearance, a solids content of about 50% by weight and a viscosity of 0,64 Pa.s.

After drying on different substrates the resulting coating showed a high gloss.

EXAMPLE XII

A dispersion was prepared in the same way as indicated in Example II, use being made of the following components:

| | |
|---|---|
| styrene | 150 g |
| polybutadiene (Lithene ® N) | 150 g |
| dibenzoyl peroxide (80° C.) | 6 g |
| aliphatic diluent (Shellsol TD ® of Ex. VIII) | 371 g |

After a reaction for 7 hours under nitrogen at 90° C. a stable, blue dispersion was obtained having a solids content of about 45% by weight. The viscosity was 0,79 Pa.s and the average particle size was 100 nm.

After addition of 0,01% by weight of cobalt naphthenate (calculated on the solids content) and a curing time of 1 week at room temperature the properties of a 40 μm thick coating on steel and wood were measured. For the Persoz hardness on steel a value of 135 seconds was measured. The measured gloss values on steel (Bonder 132) were >100 and 96 at 60° and 20°, respectively. On wood (meranti) values of 59 and 39 were measured at 60° and 20°, respectively.

After a reaction time of only 30 minutes the use of methyl methacrylate instead of styrene resulted in a white, solid gel-like product.

EXAMPLE XIII

A dispersion was prepared in the same way as indicated in Example XII, with the exception that instead of 150 g of styrene use was made of 118 g of methyl methacrylate and 32 g of styrene.

Upon completion of the reaction a stable, bluish dispersion was obtained having a solids content of about 45% by weight. After drying at room temperature a wholly transparent coating with a high gloss was obtained.

EXAMPLE XIV (comparative example)

The procedure of this example was identical with that of Example XIII, except that the amount of polybutadiene was reduced from 150 g to 18,75 g. Upon completion of the reaction a stable, milky white dispersion was obtained which dried at room temperature to form a white powder.

EXAMPLE XV (comparative example)

A dispersion was prepared in the same way as indicated in Example II, use being made of the following components:

| | |
|---|---|
| methyl methacrylate | 135 g |
| styrene | 31,2 g |
| polybutadiene | 41,55 g |
| dibenzoyl peroxide (80%) | 1,65 g |
| turpentine | 31,36 g |
| mole % styrene in copolymer | 18,8% |
| wt % butadiene - containing polymer, based on copolymer | 25% |
| in all | 43,8% < 50% |

Upon completion of the reaction a stable, milky white dispersion was obtained which however dried to form a non-transparent film.

EXAMPLE XVI

A dispersion was prepared in the same way as indicated in Example II, use being made of the following components:

| | |
|---|---|
| methyl methacrylate | 135 g |
| styrene | 93,6 g |
| polybutadiene | 57,15 g |

-continued

| | |
|---|---|
| dibenzoyl peroxide (80%) | 2,25 g |
| turpentine | 431,3 g |

Upon completion of the reaction a stable, bluish white dispersion was obtained which dried at room temperature to a fully transparent film having a high gloss.

If the amount of the butadiene-containing polymer (=polybutadiene) is reduced to an amount of 40,34 g (less than 20% by weight of the copolymer), a stable, milky white dispersion is obtained which dries at room temperature to a practically non-transparent film.

EXAMPLE XVII

A dispersion was prepared in the same way as indicated in Example II, use being made of the following components:

| | |
|---|---|
| methyl methacrylate | 135 g |
| styrene | 7,4 g |
| polybutadiene | 142,4 g |
| dibenzoyl peroxide (80%) | 1,42 g |
| turpentine | 428,9 g |

Upon completion of the reaction a stable, bluish white dispersion was obtained which dried at room temperature to form a wholly transparent film displaying a high gloss.

When the amount of styrene was reduced to 5,8 g (<5 mole % of the copolymer), also a stable, white dispersion was obtained. But it did not dry to form a wholly transparent film.

Upon a further decrease of the amount of styrene to 2,9 g a stable, milky white dispersion was obtained which dried at room temperature to form a white powder.

EXAMPLE XVIII

A dispersion was prepared in the same way as indicated in Example II, use being made of the following components:

| | |
|---|---|
| methyl methacrylate | 135 g |
| styrene | 15,6 g |
| polybutadiene | 100,4 g |
| dibenzoyl peroxide | 1,5 g |
| turpentine | 378 g |

Upon completion of the reaction a stable, bluish white dispersion was obtained which dried at room temperature to form a wholly transparent coating displaying a high gloss.

When the amount of polybutadiene was reduced to 52,7 g, which corresponds to 35% by weight of the copolymer, a stable dispersion was obtained, but it dried at room temperature to form a non-transparent, dull film.

EXAMPLE XIX

A. In a three-necked flask fitted with a stirrer, a reflux condenser and a thermometer the following components were mixed until a homogeneous mixture was obtained: COOH-functionalized polybutadiene having a number average molecular weight of 2000 and composed of

| | |
|---|---|
| 79% of vinyl-1,2-butadiene, 21% of cis- and trans-1,4-butadiene | 1000 g |
| glycidyl ester of 1,1-dimethyl-1-heptane carboxylic acid | 250 g |
| triphenyl benzoyl phosphonium chloride | 2,5 g |

The reaction mixture was heated for 3 hours at 150° C., in the process of which the carboxyl groups reacted with the epoxy groups to form OH groups. After completion of the reaction the acid number was <1.

B. 250 g of a reaction product obtained under A contained in a three-necked flask fitted with a stirrer, a reflux condenser and a thermometer were homogeneously mixed with:

| | |
|---|---|
| isophoron diisocyanate | 15 g |
| turpentine | 265 g |
| dibutyltin diacetate | 0,25 g |

After 2 hours' heating under nitrogen at 120° C. a urethane groups-containing polybutadiene block copolymer was obtained. The block copolymer was composed of about 75% by weight of polybutadiene and had a number average molecular weight of 8000. The solids content was about 50% by weight.

C. A dispersion was prepared in the same way as indicated in Example II, use being made of the following compounds:

| | |
|---|---|
| styrene | 100 g |
| methyl methacrylate | 100 g |
| the block copolymer (50%) prepared under B | 400 g |
| dibenzoyl peroxide (80%) | 4 g |
| turpentine | 742 g |

Upon completion of the reaction a stable, bluish white dispersion was obtained having a solids content of about 30% by weight and a viscosity of 0,28 Pa.s. The dispersion dried at room temperature to a wholly transparent coating with a high gloss.

After adding 0,01% by weight of cobalt naphthenate (calculated on the solids content) and a curing time of one week at room temperature the properties of a coating 40 $\mu$m thick on steel and wood were measured. For the Persoz hardness on steel a value of 175 seconds was measured. The measured gloss values on steel (Bonder 132) were 89 and 74 at 60° and 20°, respectively.

On wood (oak) the values measured were 42 and 12 at 60° and 20°, respectively.

D. If in the preparation of the block copolymer under B use is made of 20 g of isophoron diisocyanate instead of 15 g, then a polybutadiene block copolymer is obtained with a number average molecular weight of 30000.

Use of this block copolymer in the preparation of a dispersion using the components given under C resulted upon completion of the reaction in an extremely viscous, rubbery gel.

EXAMPLE XX

A dispersion was prepared in the same way as indicated in Example II, use being made of the following components:

| | |
|---|---|
| methyl methacrylate | 60 g |
| 2-hydroxy propyl methacrylate | 30 g |
| styrene | 20 g |
| butyl methacrylate | 90 g |
| polybutadiene | 100 g |
| dibenzoyl peroxide (80%) | 2,5 g |
| turpentine | 453 g |

Upon completion of the reaction a stable, bluish dispersion was obtained which had a solids content of about 40% by weight and a viscosity of 0,15 Pa.s. Upon drying at room temperature a wholly transparent coating was formed.

After adding 0,01% by weight of cobalt naphthenate (calculated on the solids content) and 1 week's curing at room temperature the properties of a coating 40 μm thick on steel and wood were measured. For the Persoz hardness on steel a value of 200 seconds was measured. The gloss values measured on steel (Bonder 132) were 95 and 85 at 60° and 20°, respectively. On wood (oak) values of 56 and 14 were measured at 60° and 20°, respectively.

EXAMPLE XXI

A dispersion was prepared in the same way as indicated in Example II, use being made of the following components:

| | |
|---|---|
| methyl methacrylate | 60 g |
| 2-hydroxypropyl methacrylate | 30 g |
| styrene | 30 g |
| 2-ethylhexyl methacrylate | 95 g |
| polybutadiene | 107,5 g |
| dibenzoyl peroxide (80%) | 2,5 g |
| turpentine | 757 g |

Upon completion of the reaction a stable, bluish dispersion was obtained which had a solids content of about 30% by weight and a viscosity of 0,72 Pa.s.

After adding 0,01% by weight of cobalt naphthenate (calculated on the solids content) and 1 week's curing at room temperature the properties of a coating 40 μm thick on steel and wood were measured.

For the Persoz hardness on steel a value of 200 sec. was measured. The gloss values measured on steel (Bonder 132) were 96 and 89 at 60° and 20°, respectively. On wood (oak) the values measured were 55 and 17 at 60° and 20°, respectively.

EXAMPLE XXII

A dispersion was prepared in the same way as indicated in Example II, use being made of the following components:

| | |
|---|---|
| methyl methacrylate | 80 g |
| methacrylic acid | 4,3 g |
| glycidyl methacrylate | 7,1 g |
| styrene | 46,8 g |
| butyl methacrylate | 63,9 g |
| polybutadiene | 101 g |
| dibenzoyl peroxide (80%) | 3 g |
| aliphatic diluent (Shellsol TD ® of Ex. VIII) | 458 g |

Upon completion of the reaction a stable, bluish dispersion was obtained which had a solids content of about 40% by weight.

EXAMPLE XXIII

A dispersion was prepared in the same way is indicated in Example II, use being made of the following components:

| | |
|---|---|
| methyl methacrylate | 80 g |
| methacrylic acid | 4,3 g |
| glycidyl methacrylate | 7,1 g |
| styrene | 46,8 g |
| butyl methacrylate | 63,9 g |
| polybutadiene | 101 g |
| dibenzoyl peroxide (80%) | 3 g |
| aliphatic diluent (Shellsol TD of Ex. VIII) | 458 g |

The dispersion obtained upon completion of the reaction was stable and had a bluish colour. The solids content was about 40% by weight. After drying at room temperature a wholly transparent coating was obtained.

A 40 μm thick coating on steel (Bonder 132) was cured for 30 minutes at 140° C. The Persoz hardness measured was 125 sec. The gloss values measured were 96 and 89 at 60° and 20°, respectively.

EXAMPLE XXIV

Of the dispersion prepared in accordance with Example XXIII 210 g were mixed with 19 g of a non-leafing aluminium paste and 19 g of turpentine. The viscosity of the resulting coating composition was 30 sec. in Ford cup No 4. After spraying onto a steel test panel (Bonder 132) and drying a 15 μm thick coating was obtained which had a metallic appearance. Onto this coating there was subsequently sprayed a conventional acrylate/melamine coating composition. After curing for 30 minutes at 140° C. a metallic coating was obtained which displayed a high gloss.

EXAMPLE XXV

A dispersion was prepared as indicated in Example II, use being made of the following components:

| | |
|---|---|
| methyl methacrylate | 68,4 g |
| 2-hydroxypropyl methacrylate | 32,8 g |
| styrene | 57 g |
| butyl methacrylate | 51,8 g |
| polybutadiene | 90 g |
| dibenzoyl peroxide | 2,5 g |
| white spirit (boiling point 140°–160° C.) | 302 g |

The dispersion obtained upon completion of the reaction was stable and had a bluish white colour. The solids content was about 50% by weight. After drying at room temperature a wholly transparent coating was obtained.

EXAMPLE XXVI

Of the dispersion prepared in accordance with Example XXV 100 g were homogeneously mixed with 10 g of hexabutoxymethyl melamine (60% solution in isobutanol) and 11 g of white spirit (boiling point 140°–160° C.). The viscosity of the resulting composition was 25 seconds in a ford cup No. 4.

Of a coating 40 μm thick on steel (Bonder 132) and cured for 30 minutes at 140° C. the following properties were measured.

The Persoz hardness was found to be 145 sec. The gloss values 95 and 88 at 60° and 20°, respectively.

EXAMPLE XXVII

A coating as prepared in Example XXVI was applied to a steel panel and cured, use being made however of 20 g of hexabutoxymethyl melamine (60% by weight) instead of 10 g. The coating, which was cured for 30 minutes at 140° C., had a Persoz hardness of 210 sec. The gloss values were 94 and 86 at 60° and 20°, respectively.

I claim:

1. A stable dispersion of addition (co)polymers in an inert relatively non-polar organic hydrocarbon liquid, the dispersed particles embracing both a (co)polymer and a polymer containing an ethylenically unsaturated monomer, characterized in that the (co)polymers are substantially composed of:
   a. 5 to 100 mole % of styrene and/or methyl styrene;
   b. 0 to 95 mole % of alkyl methacrylate having 1 or 2 carbon atoms in the alkyl group and/or alkoxyalkylene methacrylate having 1 to 2 carbon atoms in the alkoxy group and the alkylene group; and an effective amount of at least one of,
   c. up to 40 mole % of alkyl methacrylate having 3 to 12 carbon atoms in the alkyl group;
   d. up to 40 mole % of hydroxyalkyl methacrylate having 2 to 12 carbon atoms in the alkyl group and/or glycidyl methacrylate; and
   e. up to 20 mole % of methacrylic acid, and that they are grafted to a functionalized or a non-functionalized polymer of a number average molecular weight of 2,000 to 10,000, at least 60% by weight of which consists of butadiene, the weight percentage of the butadiene-containing polymer being 20 to 200% of that of the (co)polymer and the sum of this percentage and the percentage of styrene and/or methyl styrene in the copolymer being higher than or equal to 50, said dispersion containing solid particles having a number average molecular weight in the range of 60,000 to 1,000,000, and said dispersion drying at room temperature to yield essentially a smooth film having a high gloss.

2. A dispersion according to claim 1, characterized in that the weight ratio between the (co)polymers and the graft polymer is in the range of 4:1 to 1:2.

3. A dispersion according to claim 1, characterized in that the graft polymer containing at least 60% by weight of butadiene is functionalized with —OH and/or —COOH groups.

4. A dispersion according to claim 1, characterized in that the graft polymer functionalized with —OH and/or —COOH groups has been reacted with a diisocyanate to form a polyurethane or a polyamide.

5. A dispersion according to claim 1, characterized in that the graft polymer is composed of butadiene, styrene and/or acrylonitrile.

6. A dispersion according to claim 1, characterized in that when use is made of hydroxyalkyl methacrylate it also contains a compound reacting with hydroxyl groups.

7. A dispersion according to claim 1, characterized in that the compound reacting with hydroxyl groups is polyalkoxyalkyl melamine.

8. A dispersion according to claim 1, characterized in that the compound reacting with hydroxyl groups is polybutoxymethyl melamine.

9. A dispersion according to claim 1, characterized in that it contains a drier, such as the octoate or naphthenate of Co, Ce, Fe, Cu, Mn, Zr, Ca, Ba and/or Pb.

10. A dispersion according to claim 1, characterized in that it contains a pigment in an amount of at least 5% by weight, based on the addition (co)polymers.

11. A dispersion according to claim 10, characterized in that as pigment non-leafing aluminium is used.

12. A process for the preparation of a stable dispersion of addition (co)polymers in an inert relatively non-polar organic hydrocarbon liquid, the dispersed particles embracing both a (co)polymer and a graft polymer, characterized in that a composition substantially consisting of:
   a. 5 to 100 mol % of styrene and/or methyl styrene;
   b. 0 to 95 mole % of alkyl methacrylate with 1 or 2 carbon atoms in the alkyl group and/or alkoxyalkylene methacrylate with 1 or 2 carbon atoms in the alkoxy group and the alkylene group; and an effective amount of at least one of
   c. up to 4 mole % of alkyl methacrylate with 3 to 12 carbon atoms in the alkyl group,
   d. up to 40 moles % of hydroxyalkyl methacrylate with 2 to 12 carbon atoms in the alkyl group and/or glycidyl methacrylate; and
   e. up to 20 mole % of methacrylic acid, together with an active amount of a peroxide as initiator is polymerized in an inert relatively non-polar organic hydrocarbon liquid at a temperature of 60° to 120° C. in the presence of a functionalized or non-functionalized graft polymer containing at least 60% by weight of butadiene and having a number average molecular weight in the range of 2,000 to 10,000, the weight percentage of the graft polymer being 20 to 200% of that of the (co)polymer and the sum of this percentage and the percentage of styrene and/or methyl styrene in the copolymer being higher than or equal to 50, said dispersion containing solid particles having a number average molecular weight in the range of 60,000 to 1,000,000, and said dispersion drying at room temperature to yield essentially a smooth film having a high gloss.

13. A process according to claim 12, characterized in that the weight ratio between the (co)polymer and the graft polymer is in the range of 4:1 to 1:2.

14. A process according to claim 12, characterized in that the polymerization is carried out in an inert relatively non-polar organic hydrocarbon liquid which is a non-solvent for polystyrene and/or polymethyl styrene and/or styrene-methacrylate copolymers and/or styrene methacrylate methacrylic acid copolymers and/or methyl styrene-methacrylate copolymers and/or methyl styrene-methacrylate-methacrylic acid copolymers and a solvent for the graft polymer.

15. A process according to claim 12, characterized in that the inert relatively non-polar organic hydrocarbon liquid contains at least 50% by weight of aliphatic hydrocarbons.

16. A process according to claim 12, characterized in that the polymerization is carried out in turpentine, white spirit, petroleum ether or iso-octane.

17. A process according to claim 12, characterized in that the polymerization is carried out using as initiator a substituted or unsubstituted dibenzoyl peroxide in an amount of 0,1 to 10% by weight, calculated on the graft polymer.

18. A process according to claim 12, characterized in that the polymerization is carried out using as initiator a substituted or unsubstituted dibenzoyl peroxide in an amount of 1 to 5% by weight, calculated on the graft polymer.

19. A process according to claim 17 or 18, characterized in that as substituted dibenzoyl peroxide there is used di(ortho-methylbenzoyl)peroxide and/or di(2,4-dichlorobenzoyl)peroxide.

20. A process according to claim 12, characterized in that the polymerization is carried out at a temperature in the range of 80° to 100° C.

21. A process for coating a substrate of wood, plastics or a metal, characterized in that a dispersion according to claim 1 is applied to the substrate and cured.

* * * * *